United States Patent
Li et al.

(10) Patent No.: US 8,290,374 B2
(45) Date of Patent: Oct. 16, 2012

(54) DISPERSION COMPENSATION METHOD AND DEVICE IN OPTICAL COMMUNICATION SYSTEM

(75) Inventors: Junrui Li, Shenzhen (CN); Jing Nui, Shenzhen (CN); Chunyan Yang, Shenzhen (CN); Changbin Hu, Shenzhen (CN); Kai Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 377 days.

(21) Appl. No.: 12/646,701

(22) Filed: Dec. 23, 2009

(65) Prior Publication Data

US 2010/0166435 A1   Jul. 1, 2010

(30) Foreign Application Priority Data

Dec. 31, 2008   (CN) .......................... 2008 1 0246813

(51) Int. Cl.
*H04B 10/12*   (2006.01)

(52) U.S. Cl. ........................... 398/147; 398/159; 398/81

(58) Field of Classification Search .................. 398/147, 398/159, 158, 81, 4, 5
See application file for complete search history.

(56) References Cited

U.S. PATENT DOCUMENTS 6,278,536 B1 * 8/2001 Kai et al. ........................ 398/79

| 2002/0071148 A1 | 6/2002 | Purse et al. |
| 2002/0089712 A1 | 7/2002 | Kang et al. |
| 2004/0190906 A1 | 9/2004 | Jain |

FOREIGN PATENT DOCUMENTS

EP   2007042 A2   12/2008

OTHER PUBLICATIONS

Extended European Search Report in corresponding European Application No. 09180905.3 (Apr. 27, 2010).

* cited by examiner

*Primary Examiner* — M. R. Sedighian
(74) *Attorney, Agent, or Firm* — Leydig, Voit & Mayer, Ltd.

(57) ABSTRACT

A dispersion compensation method and a dispersion compensation device in an optical communication system are provided. The method mainly includes the following steps. A dispersion compensation value transmitted through a working path at a second wavelength is received through a non-working path at a first wavelength in an optical communication system. The non-working path at the first wavelength and the working path at the second wavelength use the same service channel. Dispersion in the non-working path at the first wavelength is compensated according to the dispersion compensation value. Therefore, no matter the working path is a main path or a backup path, the dispersion compensation value on the non-working path can be accurately regulated in time, such that the dispersion of the working path reaches an optimal status each time after the protection switching occurs to the service, thereby ensuring the fast switching of the service.

4 Claims, 6 Drawing Sheets

DISPERSION COMPENSATION METHOD AND DEVICE IN OPTICAL COMMUNICATION SYSTEM

CROSS-REFERENCE TO RELATED APPLICATION

This application claims priority to Chinese Patent Application No. 200810246813.3, filed on Dec. 31, 2008, which is hereby incorporated by reference in its entirety.

FIELD OF THE TECHNOLOGY

The present invention relates to the field of optical communication technology, and more particularly to a dispersion compensation method and a dispersion compensation device in an optical communication system.

BACKGROUND OF THE INVENTION

A high-speed optical communication system is very sensitive to dispersion in the system. If the dispersion is not matched with the system, the system performance is rapidly deteriorated. Therefore, the dispersion compensation for a high-speed optical communication system can enhance the performance and reliability of the system.

Figure 1:
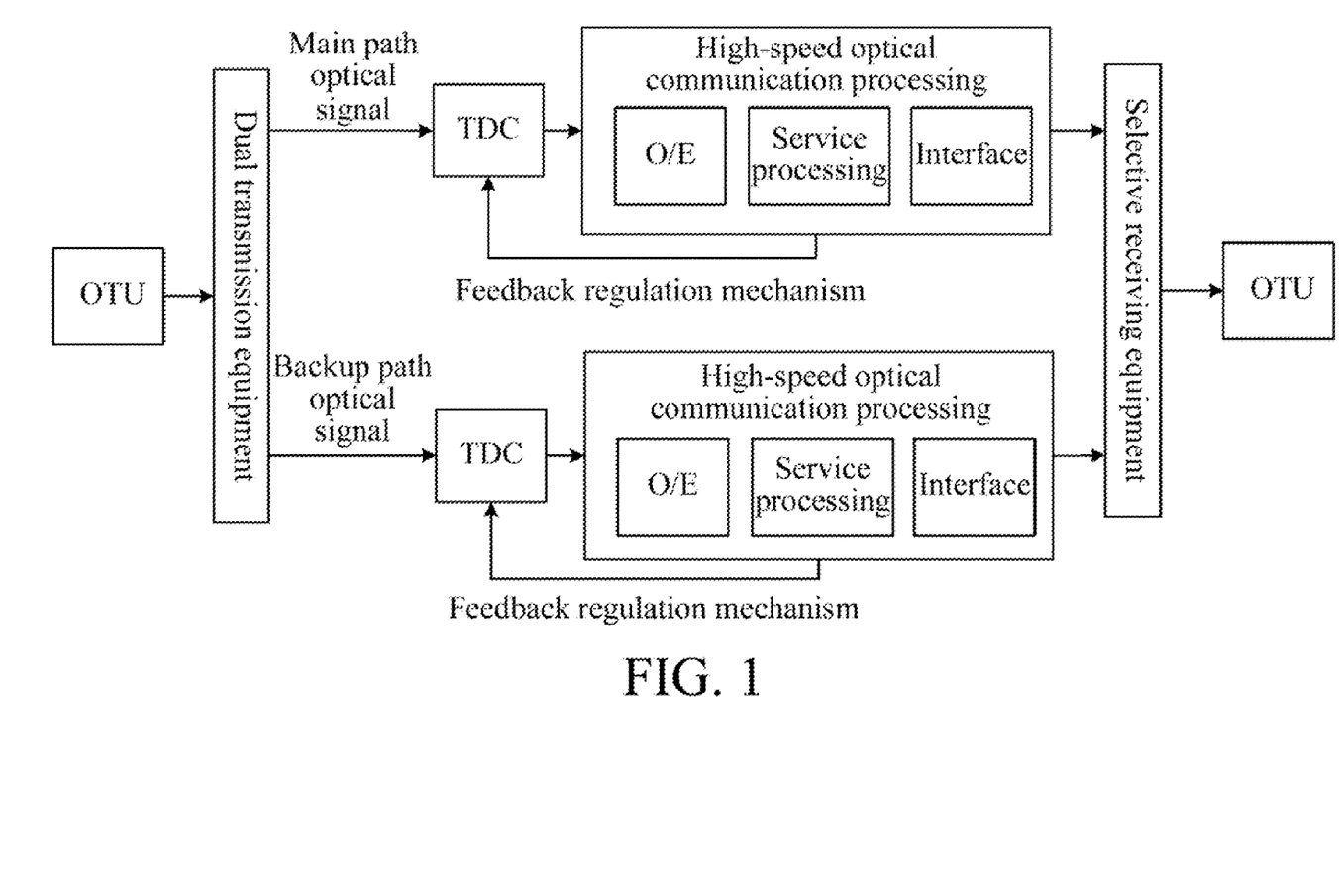
FIG. 1 is a schematic principle view of a dispersion compensation solution for a high-speed optical communication system in the prior art.

Taking a 40G optical transponder unit (OTU) board as an example, FIG. 1 is a schematic principle view of a dispersion compensation solution for a high-speed optical communication system in the prior art.

When an in-board extension protection is performed on the 40G OTU board, a tunable dispersion compensator (TDC) component is disposed at a main channel and at a backup channel respectively. When a service is performed in the main channel, a dispersion compensation value in the main channel is regulated through a high-speed optical communication processing module and a feedback regulation mechanism in the main channel shown in FIG. 1 according to quality of service signals detected by the OTU, and the dispersion in the main channel is then compensated according to the dispersion compensation value. When the service is performed in the backup channel, a dispersion compensation value in the backup channel is regulated through a high-speed optical communication processing module and a feedback regulation mechanism in the backup channel shown in FIG. 1 according to a signal quality detected by the OTU, and the dispersion in the backup channel is then compensated according to the dispersion compensation value.

In the implementation of the present invention, the inventor(s) find that the prior art at least has the following problem. The dispersion compensation values in the main channel and the backup channel need to be regulated continuously according to the quality of service signals detected by the OTU, and due to a non-linear relation between the dispersion compensation value and the signal quality, the regulation process is rather time-consuming.

Especially, when an optical fiber in the backup channel is located outdoors, as external conditions such as temperature, humidity, air pressure are changed, the dispersion in the backup channel also varies at any time. When the protection switching from the main channel to the backup channel occurs to the service, as the regulation of the dispersion compensation value in the backup channel lasts for a long time, the protection switching cannot be realized quickly. Similarly, when the protection switching from the backup channel to the main channel occurs to the service, as the regulation of the dispersion compensation value in the main channel lasts for a long time, the protection switching also cannot be realized quickly.

SUMMARY OF THE INVENTION

Accordingly, the present invention is directed to a dispersion compensation method and a dispersion compensation device in an optical communication system, which are applicable to solve the problem in the prior art that a fast switching cannot be realized due to a long time regulation of a dispersion compensation value during the protection switching.

The present invention provides a dispersion compensation method in an optical communication system, which includes the following steps.

A dispersion compensation value transmitted through a working path at a second wavelength is received through a non-working path at a first wavelength. The non-working path at the first wavelength and the working path at the second wavelength use the same service channel.

Dispersion in the non-working path at the first wavelength is compensated according to the dispersion compensation value.

The present invention provides a dispersion compensation device in an optical communication system, which includes a dispersion-compensation-value receiving module and a compensation processing module.

The dispersion-compensation-value receiving module is adapted to receive a dispersion compensation value transmitted from a working path at a second wavelength through a non-working path at a first wavelength. The non-working path at the first wavelength and the working path at the second wavelength use the same service channel.

The compensation processing module is adapted to compensate dispersion in the non-working path at the first wavelength according to the dispersion compensation value received by the dispersion-compensation-value receiving module.

As seen from the technical solutions provided in the present invention, no matter the working path is a main path or a backup path, a dispersion compensation value on a non-working path can be accurately regulated in time, such that the dispersion status of the working path is optimal each time after the protection switching occurs to the service, thereby ensuring the fast switching of the service.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

In an embodiment of the present invention, a dispersion compensation value transmitted through a working path at a second wavelength is received through a non-working path at a first wavelength in an optical communication system. The non-working path at the first wavelength and the working path at the second wavelength use the same service channel.

Dispersion in the non-working path at the first wavelength is compensated according to the dispersion compensation value.

Furthermore, the non-working path and the working path include a main path or a backup path.

Furthermore, an OTU corresponding to the second wavelength detects quality of service signals in the service channel used by the working path at the second wavelength, and regulates a dispersion compensation value of the working path at the second wavelength according to the quality of service signals.

Dispersion in the working path at the second wavelength is compensated according to the regulated dispersion compensation value and the regulated dispersion compensation value is transmitted to the non-working path at the first wavelength.

An OTU corresponding to the first wavelength receives the dispersion compensation value. Alternatively, a TDC component of the first wavelength in the backup path serving as the non-working path receives the dispersion compensation value.

Furthermore, the OTU corresponding to the second wavelength detects the quality of service signals in the service channel at any time according to a change of an external environment of the service channel, and regulates the dispersion compensation value in the working path at the second wavelength at any time according to the quality of service signals.

Furthermore, after a working path at the first wavelength is switched, the OTU corresponding to the second wavelength transmits the regulated dispersion compensation value to a main path or a backup path serving as a non-working path originally and serving as a working path currently at the first wavelength.

Furthermore, when the non-working path at the first wavelength is a main path, after the OTU corresponding to the first wavelength receives the dispersion compensation value, dispersion in the main path is compensated according to the dispersion compensation value. The dispersion compensation value is not transmitted to the TDC component in the backup path at the first wavelength, or if the dispersion compensation value has already been transmitted to the TDC component, a negation value of the dispersion compensation value is further transmitted to the TDC component.

Alternatively, when the non-working path at the first wavelength is a backup path, after the TDC component in the backup path at the first wavelength receives the dispersion compensation value, dispersion in the backup path is compensated according to the dispersion compensation value.

To make the embodiments of the present invention more comprehensible, the present invention is further illustrated in the following with reference to the accompanying drawings and several specific embodiments, and the embodiments are not intended to limit the present invention.

First Embodiment

In this embodiment, the services transmitted in an optical communication system are transmitted according to different wavelengths. A main path and a backup path are configured for each wavelength respectively. Either the main path or the backup path may be a working path. When the main path is the working path, the backup path is a non-working path, and vice versa. Practical service channels used by the main path and the backup path at each wavelength also need to be configured. In addition, a non-working path at a certain wavelength and a working path at another wavelength are configured to use the same service channel.

Figure 2A:
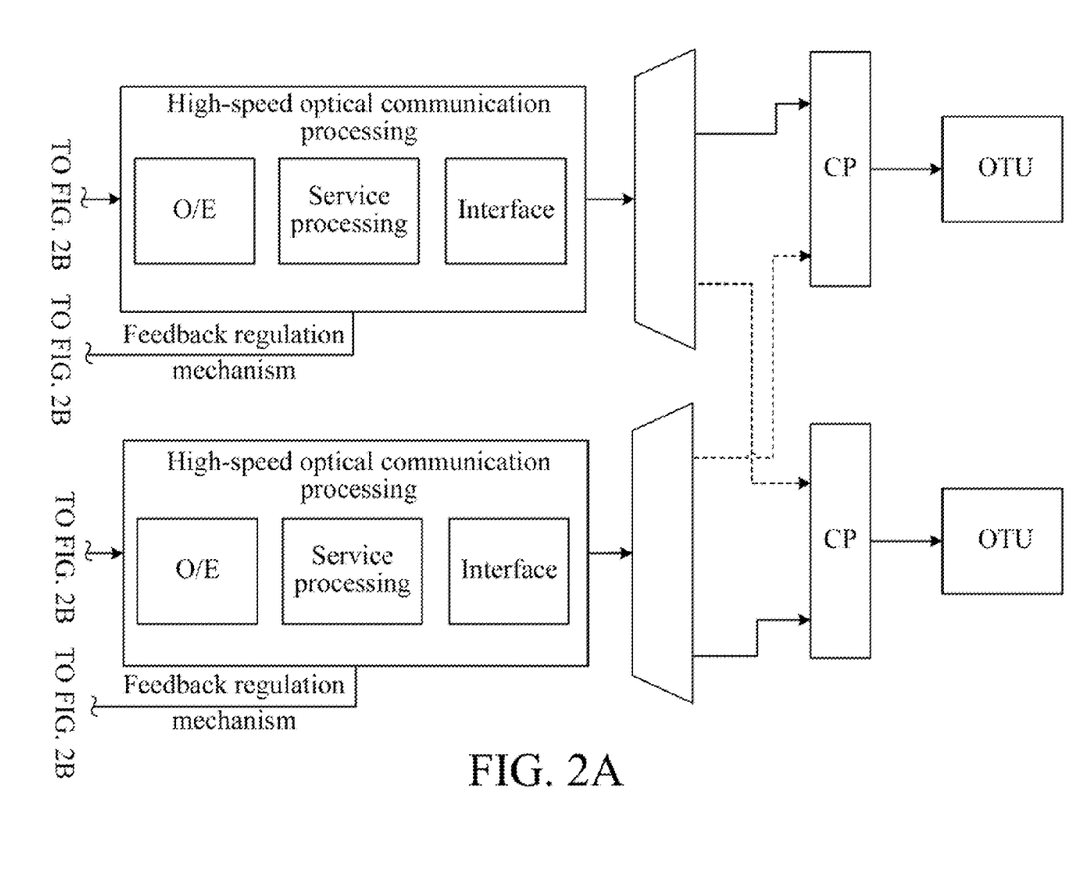
FIG. 2 is a schematic view of service channels respectively used by main paths and backup paths at different wavelengths in an optical communication system according to a first embodiment of the present invention.
Figure 2B:
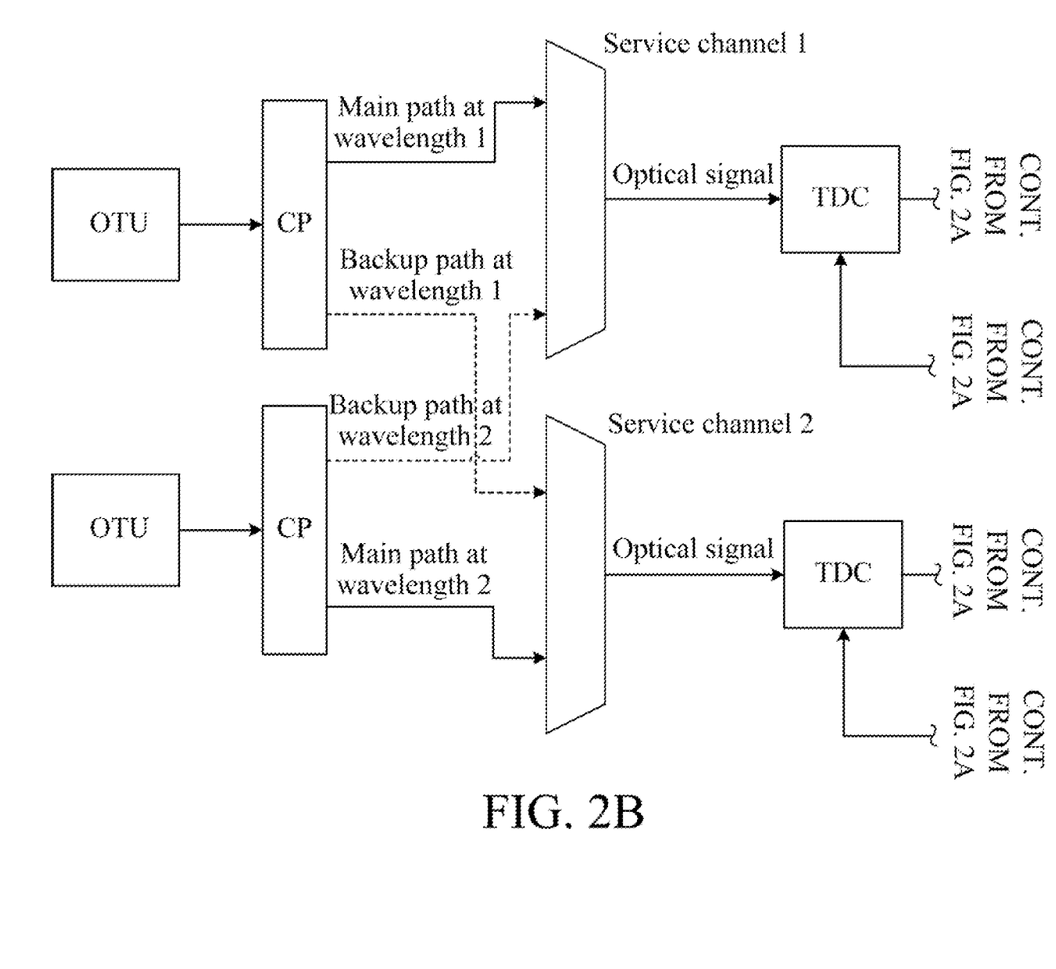

For example, the services transmitted in an optical communication system are transmitted at a wavelength 1 and a wavelength 2 respectively. FIG. 2 is a schematic view of service channels respectively used by main paths and backup paths at different wavelengths in an optical communication system according to a first embodiment of the present invention. In FIG. 2, real lines represent main paths, and dashed lines represent backup paths. A service channel used by a main path at a wavelength 1 is the service channel used by a backup path at a wavelength 2 at the same time. A service channel used by a main path at a wavelength 2 is the service channel used by a backup path at the wavelength 1 at the same time.

After an OTU system is configured with service channels according to FIG. 2, first, it is configured that both the wavelength 1 and the wavelength 2 work in the respective main path. The OTUs of the wavelength 1 and the wavelength 2 can detect the quality of service signals of the paths in which the wavelength 1 and the wavelength 2 work respectively. In this case, the OTUs at back ends of the wavelength 1 and the wavelength 2 can detect the quality of service signals of the main paths respectively. Subsequently, the OTU at the back end of the wavelength 1 regulates a dispersion compensation value of the main path at the wavelength 1 through a high-speed optical communication processing module and a feedback regulation mechanism corresponding to the wavelength 1 shown in FIG. 2 according the detected quality of service signals. The OTU at the back end of the wavelength 2 regulates a dispersion compensation value of the main path at the wavelength 2 through a high-speed optical communication processing module and a feedback regulation mechanism corresponding to the wavelength 2 shown in FIG. 2 according to the detected quality of service signals. The OTUs at the back ends of the wavelength 1 and the wavelength 2 then compensate the dispersion in the main paths at the wavelength 1 and the wavelength 2 according to the regulated dispersion compensation values respectively, such that the dispersion of the main paths at the wavelength 1 and the wavelength 2 reaches the optimal status.

Next, the wavelength 1 and the wavelength 2 are switched to the respective backup path. TDC components in channel protections (CPs) on the backup paths at the wavelength 1 and the wavelength 2 cannot detect the quality of service signals by themselves. However, as the backup path at the wavelength 1 and the main path at the wavelength 2 use the same service channel, the dispersion change thereof is basically the same. Thus, the OTU at the back end of the wavelength 1 sends a message to the TDC component in the CP on the backup path at the wavelength 2 to transmit the regulated dispersion compensation value to the TDC component in the CP on the backup path at the wavelength 2. The OTU at the back end of the wavelength 2 sends a message to the TDC component in the CP on the backup path at the wavelength 1 to transmit the regulated dispersion compensation value to the TDC component in the CP on the backup path at the wavelength 1.

Subsequently, the TDC components in the CPs on the backup paths at the wavelength 1 and the wavelength 2 can compensate the dispersion in the backup paths at the wavelength 1 and the wavelength 2 according to the obtained dispersion compensation values respectively, such that the dispersion in the backup paths at the wavelength 1 and the wavelength 2 reaches the optimal status, thereby accomplishing the initial configurations for the dispersion on the main paths and the backup paths at the wavelength 1 and the wavelength 2.

After the dispersion compensation operations on the main paths and the backup paths at the wavelength 1 and the wavelength 2 are completed, the wavelength 1 and the wavelength 2 are both switched back to the main paths, such that both the wavelength 1 and the wavelength 2 transmit services through the main paths.

When the initial configuration is realized in this embodiment, the dispersion in the backup paths at the wavelength 1 and the wavelength 2 is rapidly compensated according to the dispersion compensation values obtained by the OTUs of the wavelength 1 and the wavelength 2.

Second Embodiment

Figure 3:
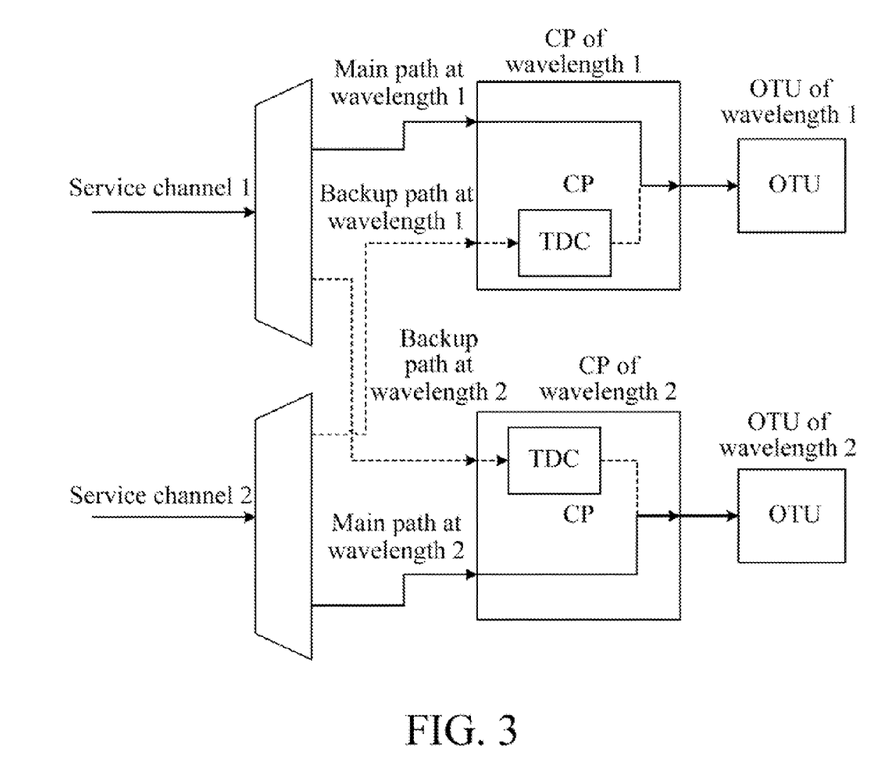
FIG. 3 is a schematic view of service channels respectively used by main paths and backup paths at a wavelength 1 and a wavelength 2 in an optical communication system according to a second embodiment of the present invention.

FIG. 3 is a schematic view of service channels respectively used by main paths and backup paths at a wavelength 1 and a wavelength 2 in an optical communication system according to a second embodiment of the present invention. Referring to FIG. 3, real lines represent main paths and dashed lines represent backup paths. A main path at the wavelength 1 and a backup path at the wavelength 2 use a service channel 1 and a backup path at the wavelength 1 and a main path at the wavelength 2 use a service channel 2.

The wavelength 1 and the wavelength 2 both use the respective main path to transmit service signals. That is, the working path is a main path and the non-working path is a backup path. With the change of external environment conditions such as temperature, humidity, or air pressure, the dispersion of the service channel 2 is changed, which causes changes to the quality of service signals. As the wavelength 2 works in the main path (using the service channel 2), the OTU of the wavelength 2 automatically detects the change of the quality of service signals in the service channel 2, regulates a dispersion compensation value in the main path at the wavelength 2 according to the change of the quality of service signals, and then compensates the dispersion in the main path (the working path) at the wavelength 2 according to the regulated dispersion compensation value, such that the dispersion of the main path at the wavelength 2 reaches an optimal status.

The service channel 2 is also the service channel used by the backup path (the non-working path) at the wavelength 1. Therefore, a dispersion compensation value of the backup path at the wavelength 1 also needs to be regulated. Thus, the OTU at the wavelength 2 sends a message to a TDC component in a CP on the backup path at the wavelength 1 to transmit the regulated dispersion compensation value to the TDC component in the CP on the backup path at the wavelength 1. Thus, the TDC component in the CP on the backup path at the wavelength 1 can compensate the dispersion in the backup path at the wavelength 1 according to the obtained dispersion compensation value, such that the dispersion of the backup path at the wavelength 1 reaches an optimal status.

In this embodiment, when the dispersion of the service channel 2 is changed, the dispersion in the main path at the wavelength 2 and the backup path at the wavelength 1 can be rapidly compensated at any time according to the dispersion compensation value obtained by the OTU of the wavelength 2.

Third Embodiment

In this embodiment, the schematic view of the configured service channels in FIG. 3 is taken as an example.

When the wavelength 2 still works in the main path but the wavelength 1 is switched from the main path to the backup path, that is, the working path at the wavelength 1 is switched to the backup path and the non-working path thereof is switched to the main path, the OTU of the wavelength 2 sends a message to the TDC component in the CP on the backup path at the wavelength 1 to transmit the regulated dispersion compensation value to the TDC component in the CP on the backup path at the wavelength 1. The TDC component in the CP on the backup path at the wavelength 1 compensates the dispersion in the backup path at the wavelength 1 according to the obtained dispersion compensation value, such that the dispersion of the backup path (the working path) at the wavelength 1 reaches an optimal status.

Subsequently, the wavelength 1 works in the backup path. As the OTU of the wavelength 1 can detect the quality of service signals of the path in which the wavelength 1 works, the OTU of the wavelength 1 is adapted to detect a change of the quality of service signals of the service channel 2 used by the backup path at the wavelength 1 and regulate the dispersion compensation value of the backup path at the wavelength 1 in time. However, as the OTU at the wavelength 1 cannot detect the quality of service signals of the non-working path at the wavelength 1, the dispersion change on the service channel 1 used by the main path (that is, the non-working path) at the wavelength 1 cannot be detected with the OTU at the wavelength 1, and also cannot be detected by the TDC component in the CP on the backup path at the wavelength 2. At this time, a wavelength 3 is set to work in a main path, and the main path at the wavelength 3 uses the service channel 1.

Figure 4:
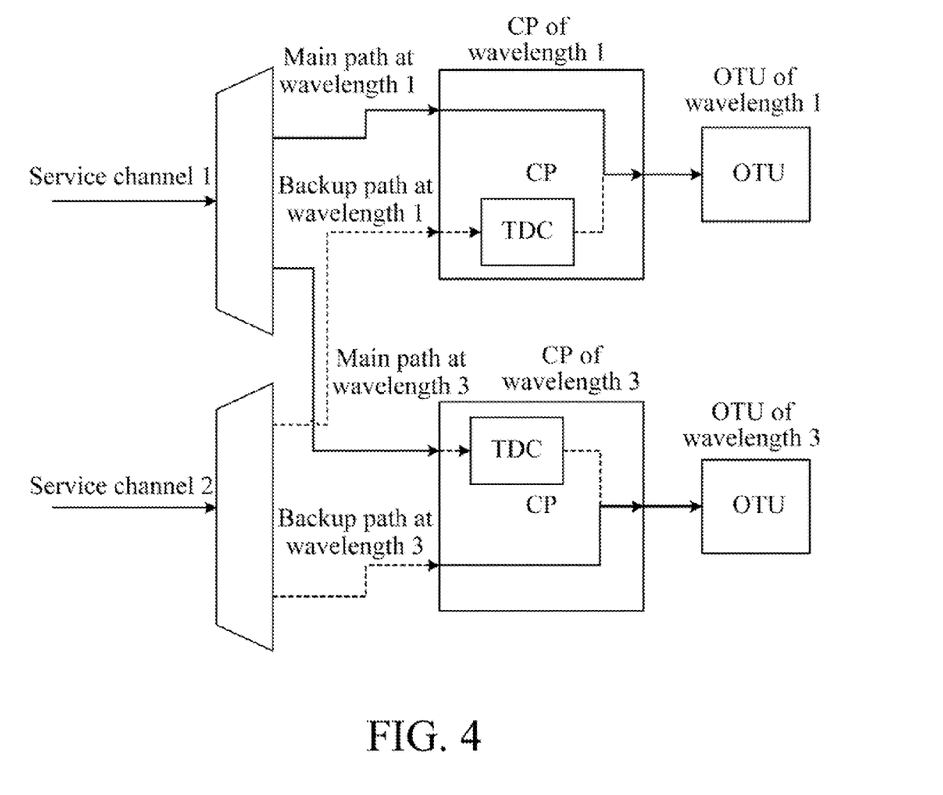
FIG. 4 is a schematic view of service channels respectively used by main paths and backup paths at a wavelength 1 and a wavelength 3 in an optical communication system according to a third embodiment of the present invention.

In this case, FIG. 4 is a schematic view of service channels respectively used by main paths and backup paths at a wavelength 1 and a wavelength 3 in an optical communication system according to a third embodiment of the present invention. Referring to FIG. 4, an OTU of the wavelength 3 automatically detects a change of the quality of service signals in the service channel 1, regulates a dispersion compensation value of the main path at the wavelength 3 according to the change of the quality of service signals, and then compensates the dispersion in the main path at the wavelength 3 according to the regulated dispersion compensation value, such that the dispersion of the main path at the wavelength 3 reaches an optimal status. Subsequently, the OTU of the wavelength 3 sends a message to the OTU of the wavelength 1 to transmit the regulated dispersion compensation value to the OTU of the wavelength 1. The OTU of the wavelength 1 compensates the dispersion in the main path of the wavelength 1 according to the obtained dispersion compensation value, such that the dispersion in the main path at the wavelength 1 reaches an optimal status.

In the process of compensating the dispersion in the main path at the wavelength 1, the OTU of the wavelength 1 further needs to be controlled not to transmit the obtained dispersion compensation value to the TDC component in the CP on the backup path at the wavelength 1. Alternatively, if the OTU of the wavelength 1 has transmitted the obtained dispersion compensation value to the TDC component in the CP on the backup path at the wavelength 1, a negation value of the obtained dispersion compensation value needs to be further transmitted to the TDC component in the CP on the backup path at the wavelength 1. Therefore, it is ensured that the dispersion of the backup path at the wavelength 1 reaches an optimal status.

In this embodiment, it is realized that the dispersion in the main path and the backup path at the wavelength 1 are rapidly compensated at any time after the protection switching occurs to the wavelength 1 and the wavelength 1 works in the backup path, so as to ensure that the dispersion of the main path and the backup path at the wavelength 1 reaches the optimal status, thereby realizing the fast protection switching.

Persons of ordinary skill in the art should understand that all or a part of the processes of the method according to the embodiments may be implemented by relevant hardware under the instruction of a computer program. The program may be stored in a computer readable storage medium. When the program is executed, the processes of the method according to the embodiments are performed. The storage medium may be a magnetic disk, an optical disk, a read-only memory (ROM), a random access memory (RAM), and the like.

Figure 5:
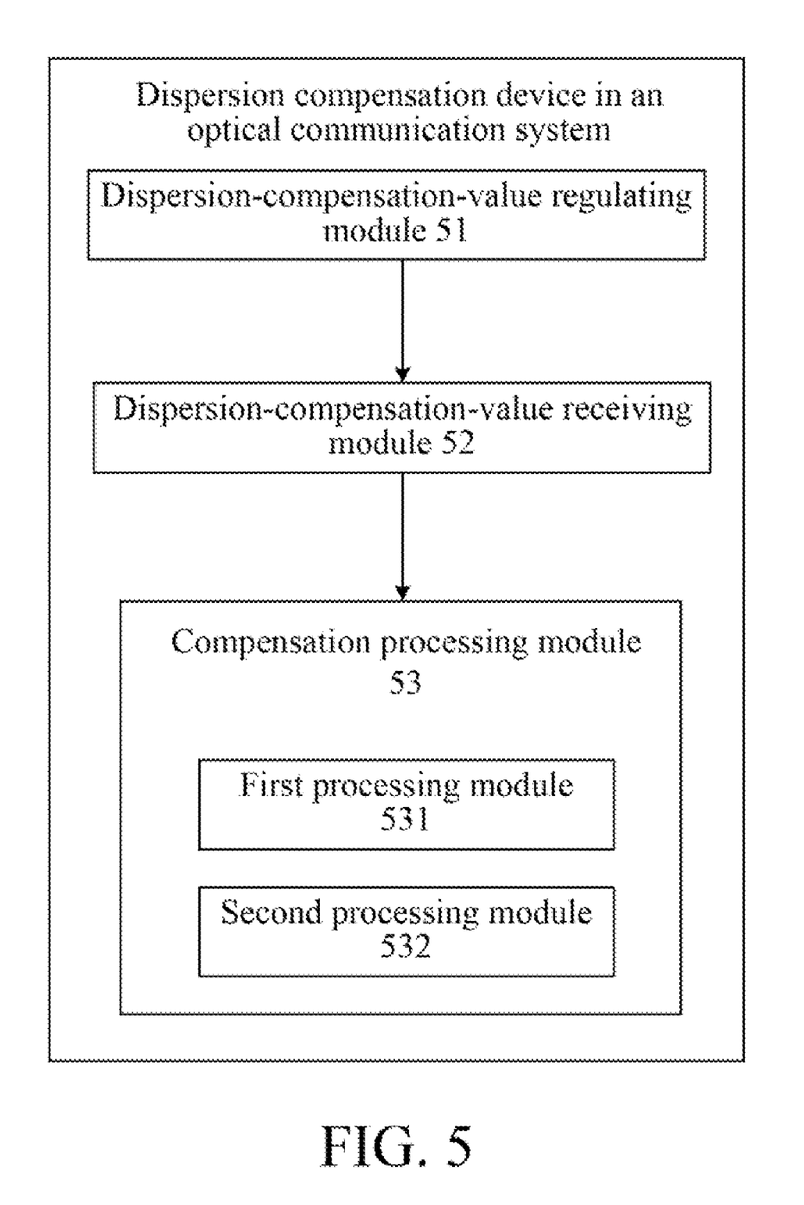
FIG. 5 is a structural view of specific implementation of a dispersion compensation device in an optical communication system according to an embodiment of the present invention.

In an embodiment, the present invention further provides a dispersion compensation device in an optical communication system. FIG. 5 is a specific implementation structure of the dispersion compensation device, which includes a dispersion-compensation-value receiving module 52 and a compensation processing module 53.

The dispersion-compensation-value receiving module 52 is adapted to receive a dispersion compensation value transmitted from a working path at a second wavelength through a non-working path at a first wavelength in an optical communication system. The non-working path at the first wavelength and the working path at the second wavelength use the same service channel.

The compensation processing module 53 is adapted to compensate dispersion in the non-working path at the first wavelength according to the dispersion compensation value received by the dispersion-compensation-value receiving module.

The device further includes a dispersion-compensation-value regulating module 51.

The dispersion-compensation-value regulating module 51 is adapted to detect quality of service signals of a service channel at any time through an OTU corresponding to the second wavelength according to a change of an external environment of the service channel, regulate the dispersion compensation value of the working path at the second wavelength according to the quality of service signals at any time, and transmit the regulated dispersion compensation value to the non-working path at the first wavelength.

The compensation processing module specifically includes a first processing module 531 and a second processing module 532.

The first processing module 531 is adapted to compensate dispersion in a main path according to the dispersion compensation value when the non-working path at the first wavelength is the main path and the OTU corresponding to the first wavelength receives the dispersion compensation value, and not to transmit the dispersion compensation value to a TDC component in a backup path at the first wavelength, or further transmit a negation value of the dispersion compensation value to the TDC component if the dispersion compensation value has already been transmitted to the TDC component.

The second processing module 532 is adapted to compensate dispersion in a backup path according to the dispersion compensation value, when the non-working path at the first wavelength is the backup path and the TDC component in the backup path at the first wavelength receives the dispersion compensation value.

The device shown in FIG. 5 may be disposed in the OTU or the TDC component.

The method and the device according to the embodiments of the present invention are applicable to high-speed communication equipment such as a 40G or 100G OTU board. Therefore, the OTU in the embodiments of the present invention may be a 40G OTU and the CP may be a CP40.

In view of the foregoing, in the embodiments of the present invention, no matter the working path is a main path or a backup path, the dispersion compensation value on the non-working path can be regulated in time, so as to ensure that the dispersion of the working path reaches an optimal status each time after the protection switching occurs to the service, thereby ensuring that the service can be switched rapidly.

In the embodiments of the present invention, the dispersion compensation value on the working path or the non-working path can be timely regulated at any time according to a change of dispersion on the working path or the non-working path.

The above descriptions are merely preferred embodiments of the present invention, but not intended to limit the scope of the present invention. Variations or replacements easily occurred to any persons skilled in the art should fall within the scope of the present invention as defined by the appended claims.

What is claimed is:

1. A dispersion compensation method in an optical communication system, comprising:

detecting, by an optical transponder unit (OTU) corresponding to a second wavelength, quality of service signals in a service channel used by a working path at the second wavelength, regulating a dispersion compensation value of the working path at the second wavelength according to the quality of service signals, compensating dispersion in the working path at the second wavelength according to a regulated dispersion compensation value, and transmitting the regulated dispersion compensation value to a non-working path at a first wavelength, wherein the non-working path at the first wavelength and the working path at the second wavelength use the same service channel; and receiving, by an OTU corresponding to the first wavelength, or by a tunable dispersion compensator (TDC) in the non-working path at the first wavelength, the regulated dispersion compensation value; and compensating dispersion in the non-working path at the first wavelength according to the regulated dispersion compensation value.

2. The dispersion compensation method in an optical communication system according to claim 1, wherein the transmitting the regulated dispersion compensation value to the non-working path at the first wavelength further comprises:

transmitting, by the OTU corresponding to the second wavelength, the regulated dispersion compensation value to a working path currently at the first wavelength after the working path at the first wavelength is switched between a main path and a backup path.

3. The dispersion compensation method in an optical communication system according to claim 1, wherein the compensating the dispersion in the non-working path at the first wavelength according to the dispersion compensation value further comprises:

when the non-working path at the first wavelength is a backup path and the TDC component in the backup path at the first wavelength receives the dispersion compensation value, compensating dispersion in the backup path according to the dispersion compensation value.

4. The dispersion compensation method in an optical communication system according to claim 1, wherein the method is applicable to a 40G or 100G OTU board.

* * * * *

UNITED STATES PATENT AND TRADEMARK OFFICE
CERTIFICATE OF CORRECTION

PATENT NO. : 8,290,374 B2  
APPLICATION NO. : 12/646701  
DATED : October 16, 2012  
INVENTOR(S) : Li et al.

Page 1 of 1

It is certified that error appears in the above-identified patent and that said Letters Patent is hereby corrected as shown below:

Title page, section (75) Inventors, "Jing Nui" should read -- Jing Niu --.

Signed and Sealed this  
Nineteenth Day of March, 2013

Teresa Stanek Rea  
*Acting Director of the United States Patent and Trademark Office*